US012700558B2

(12) United States Patent
Wang et al.

(10) Patent No.: US 12,700,558 B2
(45) Date of Patent: Aug. 4, 2026

(54) DEFLECTION MEMBER, BREAKING MODULE, AND CONTACTOR

(71) Applicant: Schneider Electric Industries SAS, Rueil-Malmaison (FR)

(72) Inventors: Yuanzhong Wang, Shanghai (CN); Jiaren Xiao, Shanghai (CN); Xuedong Xia, Shanghai (CN); Omer Karaagac, Rueil-Malmaison (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 241 days.

(21) Appl. No.: 18/564,438

(22) PCT Filed: May 18, 2022

(86) PCT No.: PCT/CN2022/093495
§ 371 (c)(1),
(2) Date: Nov. 27, 2023

(87) PCT Pub. No.: WO2022/247697
PCT Pub. Date: Dec. 1, 2022

(65) Prior Publication Data

US 2024/0249903 A1 Jul. 25, 2024

(30) Foreign Application Priority Data

May 28, 2021 (CN) ......................... 202121170845.7

(51) Int. Cl.
*H01H 73/04* (2006.01)
*H01H 73/18* (2006.01)

(52) U.S. Cl.
CPC ............ *H01H 73/18* (2013.01); *H01H 73/04* (2013.01)

(58) Field of Classification Search
CPC .......... H01H 50/02; H01H 50/54; H01H 9/30; H01H 9/345; H01H 9/346; H01H 9/38;
(Continued)

(56) References Cited

U.S. PATENT DOCUMENTS 4,237,355 A * 12/1980 Fechant ................. H01H 9/446 218/40
5,210,385 A * 5/1993 Morel .................... H01H 9/383 218/9

(Continued)

FOREIGN PATENT DOCUMENTS

CN 2415444 Y 1/2001
CN 201185139 Y 1/2009

(Continued)

OTHER PUBLICATIONS

International Search Report and Written Opinion dated Jul. 15, 2022 for corresponding International Application No. PCT/CN2022/093495, 12 pages.

(Continued)

*Primary Examiner* — William A Bolton
(74) *Attorney, Agent, or Firm* — Wolf, Greenfield & Sacks, P.C.

(57) ABSTRACT

Disclosed is a deflection member, including a first arc striking portion and a second arc striking portion extending in a first direction and parallel to each other; a base portion extending in a second direction perpendicular to the first direction and disposed in a biased manner between the first arc striking portion and the second arc striking portion in the second direction; a first connecting portion connecting the base portion and the first arc striking portion; and a second connecting portion connecting the base portion and the second arc striking portion, wherein the first arc striking portion is provided between a first moving contact and a first arc extinguishing chamber, the second arc striking portion is (Continued)

provided between a second moving contact and a second arc extinguishing chamber. According to the deflection member of the present invention, electric arc stagnation is reduced, and the arc extinguishing performance is improved.

20 Claims, 4 Drawing Sheets

(58) Field of Classification Search
CPC ...... H01H 9/46; H01H 9/44; H01H 2009/305; H01H 2009/365; H01H 73/18
USPC .... 218/1, 15, 22, 23, 30, 31, 34, 36, 38, 40, 218/46, 47, 110; 335/16, 18, 201, 202
See application file for complete search history.

(56) References Cited

U.S. PATENT DOCUMENTS

| | | | | |
|---|---|---|---|---|
| 6,103,986 | A * | 8/2000 | Asakawa | H01H 77/108 218/27 |
| 9,431,197 | B2 * | 8/2016 | Engewald | H01H 33/182 |
| 9,583,292 | B2 * | 2/2017 | Larcher | H01H 50/545 |
| 10,361,042 | B2 * | 7/2019 | Comtois | H01H 71/025 |
| 2013/0206729 | A1 | 8/2013 | Lang et al. | |
| 2013/0313228 | A1 * | 11/2013 | Friedrichsen | H01H 9/443 218/23 |
| 2014/0319099 | A1 * | 10/2014 | Baujan | H01H 33/08 218/41 |
| 2019/0333721 | A1 | 10/2019 | Tian et al. | |
| 2023/0026399 | A1 | 1/2023 | Wang et al. | |
| 2023/0030575 | A1 | 2/2023 | Wang et al. | |

FOREIGN PATENT DOCUMENTS

| | | | |
|---|---|---|---|
| CN | 103069523 | A | 4/2013 |
| CN | 204596672 | U | 8/2015 |
| CN | 107818896 | A | 3/2018 |
| CN | 208240528 | U | 12/2018 |
| CN | 109285704 | A | 1/2019 |
| CN | 109830410 | A | 5/2019 |
| CN | 210897140 | U | 6/2020 |
| CN | 210956485 | U | 7/2020 |
| CN | 215988605 | U | 3/2022 |
| JP | S59108220 | A | 6/1984 |

OTHER PUBLICATIONS

Extended European Search Report dated Mar. 12, 2025 for corresponding European Patent Application No. 22810424.6, 10 pages.
Notice of Final Rejection dated Sep. 25, 2025 for Korean Application No. 10-2023-7040799.

* cited by examiner

DEFLECTION MEMBER, BREAKING MODULE, AND CONTACTOR

CROSS-REFERENCE TO RELATED APPLICATIONS

The present application is a 35 U.S.C. § 371 National Phase filing of International Application No. PCT/CN2022/093495, filed on May 18, 2022, which claims priority to and the benefit of Chinese Patent Application No. 202121170845.7 filed, on May 28, 2021.

TECHNICAL FIELD

The invention relates to a deflection member, and a breaking module and a contactor comprising the deflection member.

BACKGROUND

The breaking module of a contactor includes a moving contact and a static contact. The moving contact realizes engagement and separation with the static contact by moving, thus realizing the opening and closing of a circuit. When the moving contact and the static contact are separating, an arc may be generated. In order to extinguish the arc, the breaking module is provided with an arc extinguishing chamber, and a device is further needed for guiding the arc from the moving contact to the arc extinguishing chamber. How to reasonably and effectively set the guiding device becomes a challenge.

SUMMARY

In view of the above problems, according to a first aspect of the present invention, a deflection member is proposed, which is installed in a breaking module of a contactor, and the breaking module includes: a first moving contact and a first static contact which are configured to be respectively engaged with and separated from each other, as well as a second moving contact and a second static contact configured to be able to be engaged and separated from each other respectively; a first arc extinguishing chamber arranged adjacent to the first moving contact and a second arc extinguishing chamber arranged adjacent to the second moving contact, wherein the deflection member comprises: a first arc striking portion and a second arc striking portion extending in a first direction and parallel to each other; a base portion extending in a second direction perpendicular to the first direction and disposed in a biased manner between the first arc striking portion and the second arc striking portion in the second direction; a first connecting portion connecting the base portion and the first arc striking portion; and a second connecting portion connecting the base portion and the second arc striking portion, wherein the first arc striking portion is arranged between the first moving contact and the first arc extinguishing chamber to guide the arc from the first moving contact to the first arc extinguishing chamber, and the second arc striking portion is arranged between the second moving contact and the second arc extinguishing chamber to guide the arc from the second moving contact to the second arc extinguishing chamber.

The deflection member according to the present invention can reduce arc stagnation and improve arc extinguishing performance.

The deflection member according to the present invention may have one or more of the following features.

According to one embodiment, the first arc striking portion, the first connecting portion, the base portion, the second connecting portion and the second arc striking portion are integrally formed by a sheet.

According to one embodiment, the base portion is provided with a base portion opening extending through the base portion, and the width of the base portion opening is slightly smaller than the width of the deflection member.

According to one embodiment, the first connecting portion is provided with a first through hole near the first arc striking portion to allow the first moving contact to move through; the second connecting portion is provided with a second through hole near the second arc striking portion to allow the second moving contact to move through, and the widths of the first through hole and the second through hole are slightly smaller than the width of the deflection member.

According to one embodiment, the base portion is arranged at an end of the breaking module away from the first static contact and the second static contact, the first connecting portion is connected to the first arc striking portion at a first distal end of the first arc striking portion away from the base portion, and the second connecting portion is connected to the second arc striking portion at a second distal end of the second arc striking portion away from the base portion, alternatively, the first connecting portion is connected to the first arc striking portion at a first proximal end of the first arc striking portion near the base portion, and the second connecting portion is connected to the second arc striking portion at a second proximal end of the second arc striking portion near the base portion.

According to one embodiment, the first connecting portion has a first blocking part near the base portion, and the second connecting portion has a second blocking part near the base portion, and the first blocking part and the second blocking part are solid to block respectively pollutants overflowing from the first arc extinguishing chamber and the second arc extinguishing chamber from approaching a moving contact assembly.

According to one embodiment, the first arc striking portion has a first protruding part at its first distal end away from the base portion and extending in the first direction, and the width of the first protruding part is smaller than that of the main body of the first arc striking portion; the second arc striking portion has a second protruding part at its second distal end away from the base portion and extending in the first direction, and the width of the second protruding part is smaller than that of the main body of the second arc striking portion.

According to one embodiment, the first connecting portion and the second connecting portion are respectively configured to extend in a straight line, alternatively, the first connecting portion and the second connecting portion are respectively formed to be composed of two or more segments extending in different directions.

According to a second aspect of the present invention, a breaking module is provided, which includes: a housing; a first static contact and a second static contact; a first moving contact and a second moving contact; a moving contact bracket connected to the first moving contact and the second moving contact and configured to move in a first direction to actuate the first moving contact and the second moving contact to move in the first direction, thereby realizing an engagement and separation of the first moving contact and the first static contact as well as an engagement and separation of the second moving contact and the second static contact; a first arc extinguishing chamber and a second arc extinguishing chamber arranged on either side of the moving contact bracket in a second direction perpendicular to the first direction; a first arc-guiding piece extending from a first arc-guiding starting end adjacent to the first static contact to a first arc-guiding ending end adjacent to the first arc extinguishing chamber; a second arc-guiding piece extending from a second arc-guiding starting end adjacent to the second static contact to a second arc-guiding ending end adjacent to the second arc extinguishing chamber; and a deflection member described as above, installed to the housing so that the first arc-guiding ending end and the first arc striking portion are arranged at either side of the first arc extinguishing chamber, and the second arc-guiding ending end and the second arc striking portion are arranged at either side of the second arc extinguishing chamber.

According to a third aspect of the present invention, a contactor is proposed, which comprises a breaking module according to the above.

BRIEF DESCRIPTION OF THE DRAWINGS

In order to illustrate the technical solutions of the embodiments of the present disclosure more clearly, the accompanying drawings of the embodiments of the present disclosure will be briefly introduced hereinafter. The accompanying drawings are only used to illustrate some embodiments of the present disclosure, but not to limit all the embodiments of the present disclosure thereto.

DETAILED DESCRIPTION OF THE EMBODIMENTS

Figure 1:
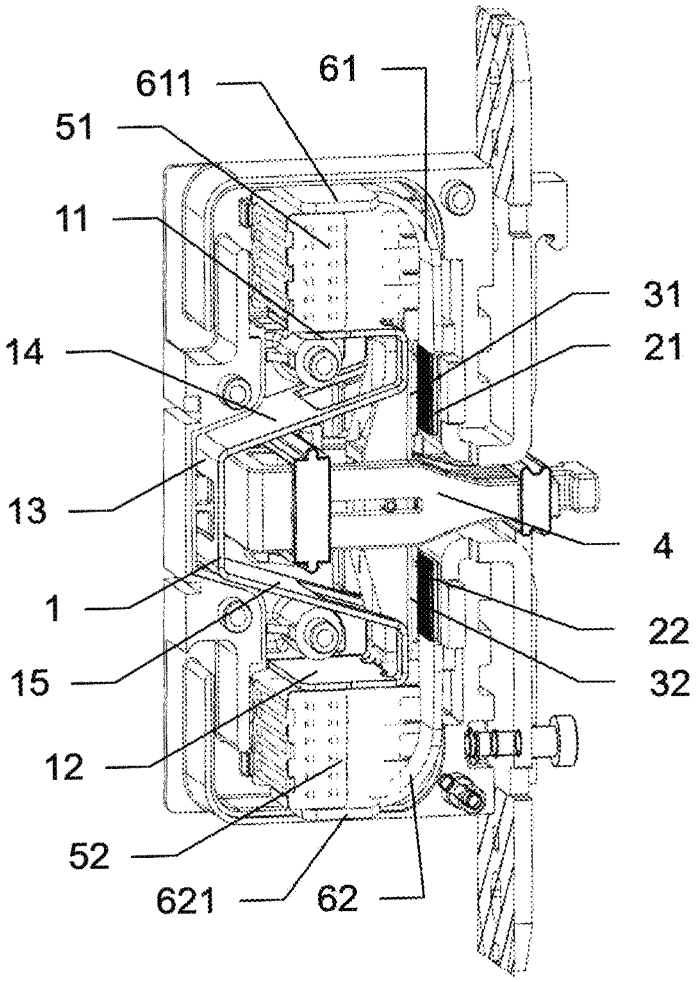
FIG. 1 is a perspective view of a deflection member according to a first embodiment of the present invention installed in a breaking module.

In order to make the purpose, technical solution and advantages of the technical solutions of the present disclosure clearer, the technical solutions of the embodiments of the present disclosure will be clearly and completely described below with reference to the drawings of specific embodiments of the present disclosure. In the drawings, the same reference numerals represent the same parts. It should be noted that the described embodiments are part of the embodiments of the present disclosure, but not all of them. Based on the described embodiments of the present disclosure, all other embodiments obtained by those of skills in the art without creative labor are within the protection scope of the present disclosure.

Unless otherwise defined, the technical terms or scientific terms used here shall have their ordinary meanings as understood by those with ordinary skills in the field to which this invention belongs. The words "first", "second" and the like used in the description and claims of the patent application of the present disclosure do not indicate any order, quantity or importance, but are only used to distinguish different components. Similarly, words "a" or "an" and the like do not necessarily mean quantity limitation. Words "comprising" or "including" and the like mean that the elements or objects appearing before the word cover the listed elements or objects appearing after the word and their equivalents, without excluding other elements or objects. Phrases like "connected to" or "connected with" are not limited to physical or mechanical connections, but can include electrical connections, whether direct or indirect. "Up", "down", "left" and "right" are only used to express relative positional relationship. When the absolute position of the described object changes, the relative positional relationship may also change accordingly.

The present disclosure will be described in detail below by describing example embodiments.

Referring first to FIG. 1, a breaking module of a contactor according to the present invention includes: a housing; a first static contact 21 and a second static contact 22; a first moving contact 31 and a second moving contact 32; a moving contact bracket 4, connected to the first moving contact 31 and the second moving contact 32, configured to move in a first direction to actuate the first moving contact 31 and the second moving contact 32 to move in the first direction, thereby realizing an engagement and separation of the first moving contact 31 and the first static contact 21 as well as an engagement and separation of the second moving contact 32 and the second static contact 22; a first arc extinguishing chamber 51 and a second arc extinguishing chamber 52 arranged on either side of the moving contact bracket 4 in a second direction perpendicular to the first direction; a first arc-guiding piece 61 extending from a first arc-guiding starting end adjacent to the first static contact 21 to a first arc-guiding ending end 611 adjacent to the first arc extinguishing chamber 51 to guide an arc from the first static contact 21 to one side of the first arc extinguishing chamber 51; a second arc-guiding piece 62 extending from a second arc-guiding starting end adjacent to the second static contact 22 to a second arc-guiding ending end 621 adjacent to the second arc extinguishing chamber 52 to guide an arc from the second static contact 22 to one side of the second arc extinguishing chamber 52; and a deflection member 1 installed to the housing, including a first arc striking portion 11 arranged between the first moving contact 31 and the first arc extinguishing chamber 51 to guide an arc from the first moving contact 31 to the other side of the first arc extinguishing chamber 51, and a second arc striking portion 12 arranged between the second moving contact 32 and the second arc extinguishing chamber 52 to guide an arc from the second moving contact 32 to the other side of the second arc extinguishing chamber 52. That is, the first arc-guiding ending end 611 and the first arc striking portion 11 are arranged on opposite sides of the first arc extinguishing chamber 51, and the second arc-guiding ending end 621 and the second arc striking portion 12 are arranged on opposite sides of the second arc extinguishing chamber 52. A plurality of arc extinguishing grids are arranged in the first arc extinguishing chamber 51 and the second arc extinguishing chamber 52, and the plurality of arc extinguishing grids extend in the first direction and are separated from each other by a certain distance, thereby achieving the effect of arc extinguishing.

Next, the specific configuration of the deflection member 1 according to the present invention will be described in detail.

The deflection member 1 according to the present invention includes a first arc striking portion 11 and a second arc striking portion 12 extending in the first direction and parallel to each other; a base portion 13 extending in the second direction perpendicular to the first direction and disposed in a biased manner between the first arc striking portion 11 and the second arc striking portion 12 in the second direction; a first connecting portion 14 connecting the base portion 13 and the first arc striking portion 11; and a second connecting portion 15 connecting the base portion 13 and the second arc striking portion 12. The first arc striking portion 11 is arranged between the first moving contact 31 and the first arc extinguishing chamber 51 to guide an arc from the first moving contact 31 to the first arc extinguishing chamber 51, and the second arc striking portion 12 is arranged between the second moving contact 32 and the second arc extinguishing chamber 52 to guide an arc from the second moving contact 32 to the second arc extinguishing chamber 52.

Preferably, the first arc striking portion 11, the first connecting portion 14, the base portion 13, the second connecting portion 15, and the second arc striking portion 12 can be integrally formed by a sheet, for example, integrally formed by stamping a metal plate. In this way, the deflection member 1 is simple to manufacture and low in cost.

Figure 2:
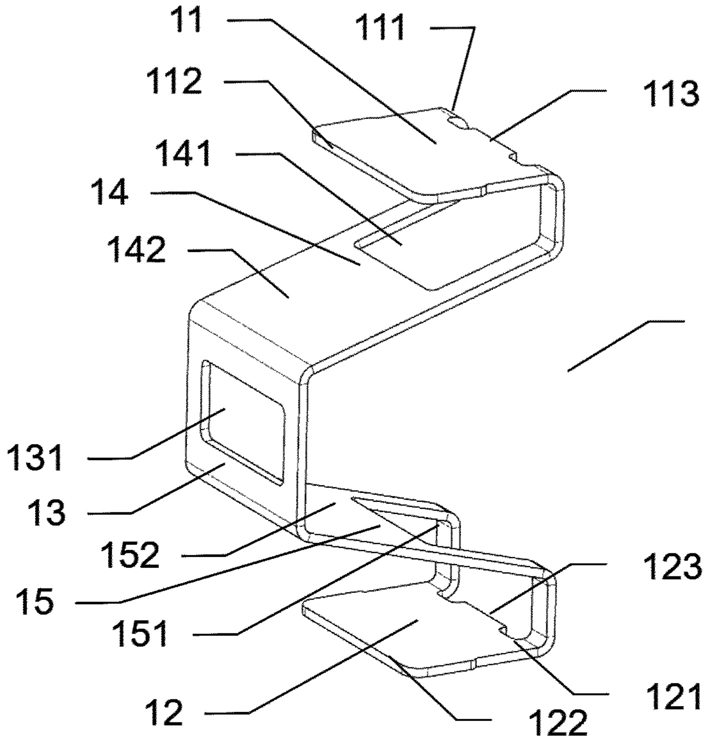
FIG. 2 is a perspective view of a deflection member according to the first embodiment of the present invention.
Figure 3:
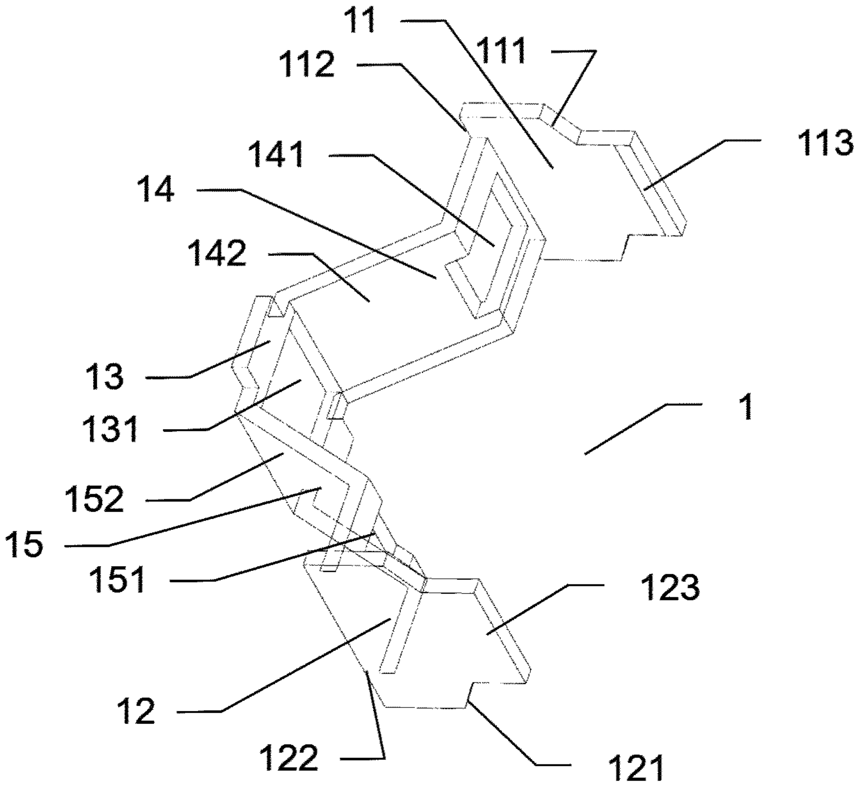
FIG. 3 is a perspective view of a deflection member according to a second embodiment of the present invention.
Figure 4:
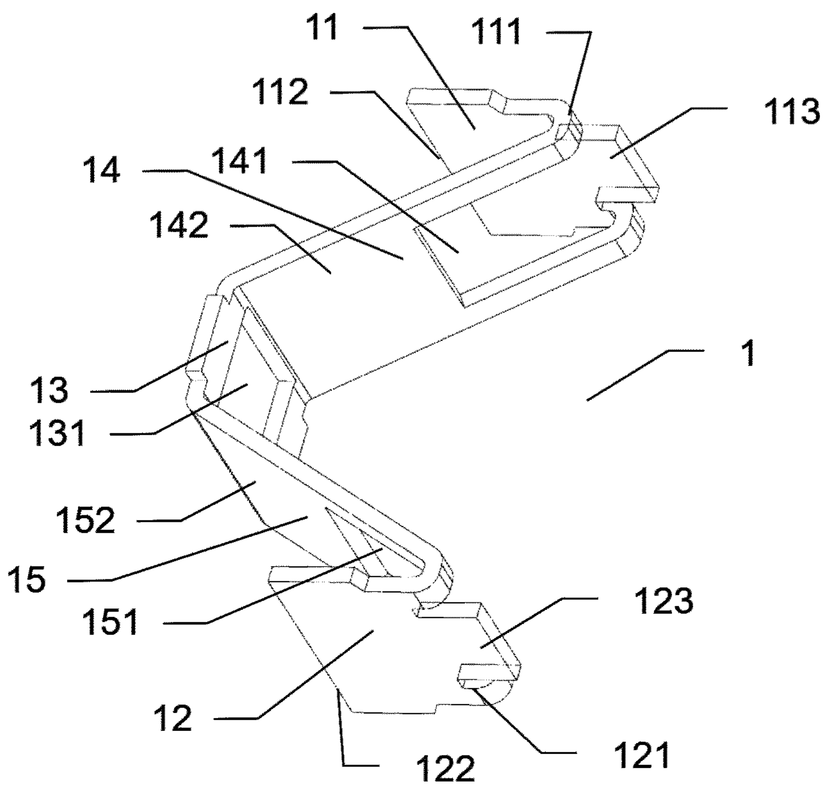
FIG. 4 is a perspective view of a deflection member according to a third embodiment of the present invention.

Preferably, the base portion 13 may be provided with a base portion opening 131 extending through the base portion 13. As shown in FIGS. 2-4, the base portion opening 131 can be provided at the base portion 13 to reduce weight and save material.

Preferably, the first connecting portion 14 is provided with a first through hole 141 near the first arc striking portion 11 to allow the first moving contact 31 to move through; the second connecting portion 15 is provided with a second through hole 151 near the second arc striking portion 12 to allow the second moving contact 32 to move through. The widths of the first through hole 141 and the second through hole 151 are slightly smaller than that of the deflection member 1. The design of the first through hole 141 and the second through hole 151 prevents interference with the first moving contact 31 and the second moving contact 32.

The base portion 13 is arranged at an end of the breaking module away from the first static contact 21 and the second static contact 22. Optionally, the first connecting portion 14 is connected to the first arc striking portion 11 at a first distal end 111 of the first arc striking portion 11 away from the base portion 13, and the second connecting portion 15 is connected to the second arc striking portion 12 at a second distal end 121 away from the base portion 13, as shown in FIGS. 2 and 4. Alternatively, the first connecting portion 14 is connected to the first arc striking portion 11 at a first proximal end 112 of the first arc striking portion 11 near the base portion 13, and the second connecting portion 15 is connected to the second arc striking portion 12 at a second proximal end 122 of the second arc striking portion 12 near the base portion 13, as shown in FIG. 3.

Preferably, the first connecting portion 14 has a first blocking part 142 near the base portion 13, and the second connecting portion 15 has a second blocking part 152 near the base portion 13. The first blocking part 142 and the second blocking part 152 are solid to respectively block pollutants overflowing from the first arc extinguishing chamber 51 and the second arc extinguishing chamber 52 from approaching the moving contact assembly, thereby protecting the respective contact portion of the moving contacts from erosion and preventing the moving contact assembly from being polluted by the arc extinguishing chambers. As shown in FIG. 1, for example, pollutants overflowing from the first arc extinguishing chamber 51 are blocked by the first blocking part 142 of the first connecting portion 14 and cannot enter the middle space including the first moving contact 31, the second moving contact 32 and the moving contact bracket 4, so as to prevent the moving contacts from being polluted.

Preferably, the first arc striking portion 11 has a first protruding part 113 at its first distal end 111 away from the base portion 13 extending in the first direction, and the width of the first protruding part 113 is smaller than that of the main body of the first arc striking portion 11; the second arc striking portion 12 has a second protruding part 123 at its second distal end 121 away from the base portion 13 extending in the first direction, and the width of the second protruding part 123 is smaller than that of the main body of the second arc striking portion 12. The first protruding part 113 and the second protruding part 123 are closer to the first moving contact 31 and the second moving contact 32, respectively, and are formed to be sharper, which is helpful for guiding the arc from the first moving contact 31 and the second moving contact 32.

Optionally, the first connecting portion 14 and the second connecting portion 15 are respectively configured to extend linearly, as shown in FIG. 4. Alternatively, the first connecting portion 14 and the second connecting portion 15 are respectively formed to be composed of two or more segments extending in different directions. As shown in FIGS. 2 and 3, they are respectively formed to be composed of two segments. It should be understood that they can also be composed of three or more segments. Furthermore, curve transition may or may not be adopted between the segments constituting the first connecting portion 14 or the second connecting portion 15, and between the first connecting portion 14 or the second connecting portion 15 and the base portion 13, the first arc striking portion 11 and the second arc striking portion 12.

First Embodiment

Next, a deflection member 1 according to a first embodiment of the present invention will be described in detail with reference to FIG. 2.

As shown in FIG. 2, the deflection member 1 is formed in an approximately M-shape with axial symmetry, and is integrally formed by sequentially connecting a first arc striking portion 11 extending in the first direction, a first connecting portion 14 connecting the first arc striking portion 11 and a base portion 13, the base portion 13 extending in the second direction, a second connecting portion 15 connecting the base portion 13 and a second arc striking portion 12, and the second arc striking portion 12 extending in the first direction. The deflection member 1 has a substantially uniform width in a third direction (also called the width direction) perpendicular to both the first direction and the second direction.

The first arc striking portion 11 and the second arc striking portion 12 are respectively formed in a sheet shape, that is, they extend in the first direction and the width direction. The first arc striking portion 11 has a first protruding part 113 at its first distal end 111 away from the base portion 13 extending in the first direction, and the width of the first protruding part 113 is smaller than that of the main body of the first arc striking portion 11. As shown in FIG. 2, the first protruding part 113 protrudes from the middle of the first distal end 111 of the first arc striking portion 11 away from the main body of the first arc striking portion 11. As can be seen in combination with FIG. 1, the first protruding part 113 is closer to the first moving contact 31, so the arrangement of the first protruding part 113 is beneficial to guiding the arc from the first moving contact 31. Similarly, the second arc striking portion 12 is provided with a second protruding part 123, which will not be described in detail here.

The base portion 13 is formed in a sheet shape with a base portion opening 131, and the width of the base portion opening 131 is slightly smaller than that of the deflection member 1. Here, "slightly smaller" means that the width of the base portion opening 131 can be larger than two-thirds, three-quarters or four-fifths of the width of the deflection member 1, so that the weight of the deflection member 1 can be reduced. The base portion 13 is offset from the first arc striking portion 11 and the second arc striking portion 12 in the first direction. Specifically, as shown in FIG. 1, the base portion 13 is further away from the first static contact 21 and the second static contact 22 than the first arc striking portion 11 and the second arc striking portion 12.

The first connecting portion 14 is connected to the first arc striking portion 11 at a first distal end 111 of the first arc striking portion 11 away from the base portion 13, and the second connecting portion 15 is connected to the second arc striking portion 12 at a second distal end 121 of the second arc striking portion 12 away from the base portion 13. The first connecting portion 14 is composed of a first segment extending in the second direction and connected to the first distal end 111 of the first arc striking portion 11, and a second segment connecting the first segment and the base portion 13 in a straight line, and the direction in which the second segment extends is transverse to the first direction and the second direction. The size of the first segment is smaller than that of the second segment. Curve transition is used between the first segment and the first distal end 111 of the first arc striking portion 11, between the first segment and the second segment, and between the second segment and the base portion 13. The first connecting portion 14 is provided with a first through hole 141 near the first arc striking portion 11 to allow the first moving contact 31 to move through. Specifically, the first through hole 141 is arranged in the first segment and a portion of the second segment near the first segment, and the width of the first through hole 141 is slightly smaller than the width of the deflection member 1. Here, "slightly smaller" means that the width of the first through hole 141 can be larger than two-thirds, three-quarters or four-fifths of the width of the deflection member 1, so as to avoid interference with the first moving contact 31, make full use of space and ensure its own rigidity. In addition, the first connecting portion 14 has a first blocking part 142 near the base portion 13. Specifically, the first blocking part 142 is arranged at the second segment near the base portion 13. The first blocking part 142 is solid to block pollutants overflowing from the first arc extinguishing chamber 51 from approaching the moving contact assembly, for example, to prevent pollutants from polluting the first moving contact 31. The second connecting portion 15 is in mirror symmetry with the first connecting portion 14, and will not be described in detail here.

Second Embodiment

Next, a deflection member 1 according to a second embodiment of the present invention will be described in detail with reference to FIG. 3.

As shown in FIG. 3, the deflection member 1 is formed in an approximately mountain shape with axial symmetry, and is integrally formed by sequentially connecting a first arc striking portion 11 extending in a first direction, a first connecting portion 14 connecting the first arc striking portion 11 and a base portion 13, the base portion 13 extending in a second direction, a second connecting portion 15 connecting the base portion 13 and a second arc striking portion 12, and the second arc striking portion 12 extending in the first direction. The deflection member 1 has a width along a third direction (also referred to as the width direction) perpendicular to both the first direction and the second direction.

The first arc striking portion 11 and the second arc striking portion 12 are respectively formed in a sheet shape, that is, they extend in the first direction and the width direction. The widths of the first arc striking portion 11 and the second arc striking portion 12 are larger than those of the first connecting portion 14 and the second connecting portion 15, which helps to fix the deflection member 1 to the housing through the first arc striking portion 11 and the second arc striking portion 12. The first arc striking portion 11 has a first protruding part 113 at its first distal end 111 away from the base portion 13 extending in the first direction, and the width of the first protruding part 113 is smaller than that of the main body of the first arc striking portion 11. As shown in FIG. 3, a first protruding part 113 protrudes from the middle of the first distal end 111 of the first arc striking portion 11 away from the main body of the first arc striking portion 11. It is conceivable that the first protruding part 113 is closer to the first moving contact 31. Therefore, the arrangement of the first protruding part 113 is beneficial to guiding the arc from the first moving contact 31. Similarly, the second arc striking portion 12 is provided with a second protruding part 123, which will not be described in detail here.

The base portion 13 is formed with a base portion opening 131, and the width of the base portion opening 131 is slightly smaller than that of the deflection member 1. Here, "slightly smaller" means that the width of the base portion opening 131 can be larger than two-thirds, three-quarters or four-fifths of the width of the deflection member 1, so that the weight of the deflection member 1 can be reduced. The base portion 13 is offset from the first arc striking portion 11 and the second arc striking portion 12 in the first direction. Specifically, as shown in FIG. 1, the base portion 13 is further away from the first static contact 21 and the second static contact 22 than the first arc striking portion 11 and the second arc striking portion 12. The base portion 13 has protrusions extending to both sides in the width direction, which helps to fix the deflection member 1 to the housing by the base portion 13.

The first connecting portion 14 is connected to the first arc striking portion 11 at a first proximal end 112 of the first arc striking portion 11 near the base portion 13, and the second connecting portion 15 is connected to the second arc striking portion 12 at a second proximal end 122 of the second arc striking portion 12 near the base portion 13. The first connecting portion 14 is composed of a first segment extending in the second direction and connected to the first proximal end 112 of the first arc striking portion 11, and a second segment connecting the first segment and the base portion 13 in a straight line, and the direction in which the second segment extends is transverse to the first direction and the second direction. The size of the first segment is smaller than that of the second segment. It should be noted that the sizes of the first segment and the second segment can be set as required, and are not limited to this. The first connecting portion 14 is provided with a first through hole 141 near the first arc striking portion 11 to allow the first moving contact 31 to move through. Specifically, the first through hole 141 is arranged at the first segment or at the first segment and a portion of the second segment near the first segment, depending on the sizes of the first and second segments. The width of the first through hole 141 is slightly smaller than that of the deflection member 1. Here, "slightly smaller" means that the width of the first through hole 141 can be larger than two-thirds, three-quarters or four-fifths of the width of the deflection member 1, so as to avoid interference with the first moving contact 31, make full use of space and ensure its own rigidity. In addition, the first connecting portion 14 has a first blocking part 142 near the base portion 13. Specifically, the first blocking part 142 is arranged at the second segment near the base portion 13. The first blocking part 142 is solid to block pollutants overflowing from the first arc extinguishing chamber 51 from approaching the moving contact assembly, for example, to prevent pollutants from polluting the first moving contact 31. The second connecting portion 15 is in mirror symmetry with the first connecting portion 14, and will not be described in detail here.

Next, a deflection member 1 according to the first embodiment of the present invention will be described in detail with reference to FIG. 4.

Third Embodiment

As shown in FIG. 4, the deflection member 1 is formed in an approximately M-shape with axial symmetry, and is integrally formed by sequentially connecting a first arc striking portion 11 extending in the first direction, a first connecting portion 14 connecting the first arc striking portion 11 and a base portion 13, the base portion 13 extending in the second direction, a second connecting portion 15 connecting the base portion 13 and a second arc striking portion 12, and the second arc striking portion 12 extending in the first direction. The deflection member 1 has a width along a third direction (also referred to as the width direction) perpendicular to both the first direction and the second direction.

The first arc striking portion 11 and the second arc striking portion 12 are respectively formed in a sheet shape, that is, they extend in the first direction and the width direction. The widths of the first arc striking portion 11 and the second arc striking portion 12 are larger than those of the first connecting portion 14 and the second connecting portion 15, which helps to fix the deflection member 1 to the housing through the first arc striking portion 11 and the second arc striking portion 12. The first arc striking portion 11 has a first protruding part 113 at its first distal end 111 away from the base portion 13 extending in the first direction. The width of the first protruding part 113 is smaller than that of the main body of the first arc striking portion 11, for example, it is consistent with the width of the first through hole 141 of the first connecting portion 14. As shown in FIG. 4, the first protruding part 113 protrudes from the middle of the first distal end 111 of the first arc striking portion 11 away from the main body of the first arc striking portion 11. It is conceivable that the first protruding part 113 is closer to the first moving contact 31. Therefore, the arrangement of the first protruding part 113 is beneficial to guiding the arc from the first moving contact 31. Similarly, the second arc striking portion 12 is provided with a second protruding part 123, which will not be described in detail here.

The base portion 13 is formed with a base portion opening 131, and the width of the base portion opening 131 is slightly smaller than that of the deflection member 1. Here, "slightly smaller" means that the width of the base portion opening 131 can be larger than two-thirds, three-quarters or four-fifths of the width of the deflection member 1, so that the weight of the deflection member 1 can be reduced. The base portion 13 is offset from the first arc striking portion 11 and the second arc striking portion 12 in the first direction. Specifically, as shown in FIG. 1, the base portion 13 is further away from the first static contact 21 and the second static contact 22 than the first arc striking portion 11 and the second arc striking portion 12. The base portion 13 has protrusions extending to both sides in the width direction, which helps to fix the deflection member 1 to the housing through the base portion 13.

The first connecting portion 14 is connected to the first arc striking portion 11 at a first distal end 111 of the first arc striking portion 11 away from the base portion 13, and the second connecting portion 15 is connected to the second arc striking portion 12 at a second distal end 121 of the second arc striking portion 12 away from the base portion 13. The first connecting portion 14 is formed to connect the first arc striking portion 11 and the base portion 13 in a straight line. Curve transition is used between the first distal end 111 of the first arc striking portion 11 and the first connecting portion 14, and between the first connecting portion 14 and the base portion 13. The first connecting portion 14 is provided with a first through hole 141 near the first arc striking portion 11 to allow the first moving contact 31 to move through. Specifically, the length of the first through hole 141 is about half of that of the first connecting portion 14. It should be noted that the size of the first through hole 141 is related to the size of the first moving contact 31 and the overall size of the deflection member 1, and is not limited to this. The width of the first through hole 141 is slightly smaller than that of the deflection member 1. Here, "slightly smaller" means that the width of the first through hole 141 can be larger than two-thirds, three-quarters or four-fifths of the width of the deflection member 1, so as to avoid interference with the first moving contact 31, make full use of space and ensure its own rigidity. In addition, the first connecting portion 14 has a first blocking part 142 near the base portion 13, and the first blocking part 142 is solid to block pollutants overflowing from the first arc extinguishing chamber 51 from approaching the moving contact assembly, for example, to prevent pollutants from polluting the first moving contact 31. The second connecting portion 15 is in mirror symmetry with the first connecting portion 14, and will not be described in detail here.

By using the above-described deflection member 1, the respective contact portion of the moving contacts can be protected from erosion, the moving contact assembly can be prevented from being polluted by the arc extinguishing chambers, the arc stagnation can be reduced, and the arc extinguishing performance can be improved.

Further, experiments show that for different contactors, using different shapes of the deflection member 1 according to different embodiments described above leads to different performances, such as different arc duration, different moving contact erosion, different electrical durability and so on. Deflection members 1 with different shapes can be selected according to the actual situation.

The exemplary embodiments of the deflection member 1, the breaking module and the contactor proposed by the present invention have been described in detail above with reference to the preferred embodiments. However, those skilled in the art can understand that various variations and modifications can be made to the above specific embodiments without departing from the concept of the present invention, and various technical features and structures proposed by the present invention can be combined in various ways without exceeding the protection scope of the present invention.

LIST OF REFERENCE NUMERALS

1 deflection member
11 first arc striking portion

111 first distal end
112 first proximal end
113 first protruding part
12 second arc striking portion
121 second distal end
122 second proximal end
123 second protruding part
13 base portion
131 base portion opening
14 first connecting portion
141 first through hole
142 first blocking part
15 second connecting portion
151 second through hole
152 second blocking part
21 first static contact
22 second static contact
31 first moving contact
32 second moving contact
4 moving contact bracket
51 first arc extinguishing chamber
52 second arc extinguishing chamber
61 first arc-guiding piece
611 first arc-guiding ending end
62 second arc-guiding piece
621 second arc-guiding ending end

What is claimed is:

1. A deflection member, characterized in that the deflection member is installed in a breaking module of a contactor, and the breaking module comprises: a first moving contact and a first static contact which are configured to be respectively engaged with and separated from each other, as well as a second moving contact and a second static contact which are configured to be respectively engaged with and separated from each other; a first arc extinguishing chamber arranged adjacent to the first moving contact and a second arc extinguishing chamber arranged adjacent to the second moving contact, the deflection member comprises:

a first arc striking portion and a second arc striking portion extending in a first direction and parallel to each other;

a base portion extending in a second direction perpendicular to the first direction and disposed in a biased manner between the first arc striking portion and the second arc striking portion in the second direction;

a first connecting portion connecting the base portion and the first arc striking portion; and a second connecting portion connecting the base portion and the second arc striking portion, wherein the first arc striking portion is arranged between the first moving contact and the first arc extinguishing chamber to guide an arc from the first moving contact to the first arc extinguishing chamber, and the second arc striking portion is arranged between the second moving contact and the second arc extinguishing chamber to guide an arc from the second moving contact to the second arc extinguishing chamber, wherein the first connecting portion is provided with a first through hole near the first arc striking portion, the first through hole configured to receive the first moving contact, wherein the second connecting portion is provided with a second through hole near the second arc striking portion, the second through hole configured to receive the second moving contact, wherein the first arc striking portion has a first protruding part positioned in the first through hole, the first protruding part extending in the first direction, and wherein the second arc striking portion has a second protruding part positioned in the second through hole, the second protruding part extending in the first direction.

2. The deflection member according to claim 1, characterized in that the first arc striking portion, the first connecting portion, the base portion, the second connecting portion and the second arc striking portion are integrally formed by a sheet.

3. The deflection member according to claim 1, characterized in that the base portion is provided with a base portion opening extending through the base portion, and a width of the base portion opening is smaller than a width that of the deflection member.

4. The deflection member according to claim 1, characterized in that a width of the first through hole and a width of the second through hole are smaller than a width of the deflection member.

5. The deflection member according to claim 1, characterized in that the base portion is arranged at an end of the breaking module away from the first static contact and the second static contact, and the first connecting portion is connected to the first arc striking portion at a first distal end of the first arc striking portion away from the base portion, and the second connecting portion is connected to the second arc striking portion at a second distal end of the second arc striking portion away from the base portion, or the first connecting portion is connected to the first arc striking portion at a first proximal end of the first arc striking portion near the base portion and the second connecting portion is connected to the second arc striking portion at a second proximal end of the second arc striking portion near the base portion.

6. The deflection member according to claim 1, characterized in that the first connecting portion has a first blocking part near the base portion, and the second connecting portion has a second blocking part near the base portion, and the first blocking part and the second blocking part are solid to respectively block pollutants overflowing from the first arc extinguishing chamber and the second arc extinguishing chamber from approaching a moving contact assembly.

7. The deflection member according to claim 1, characterized in that the first protruding part is positioned at a first distal end of the first arc striking portion, the first distal end positioned away from the base portion wherein a width of the first protruding part is smaller than that of a main body of the first arc striking portion, wherein the second protruding part is positioned at a second distal end of the second arc striking portion, the second distal end positioned away from the base portion, and wherein a width of the second protruding part is smaller than that of a main body of the second arc striking portion.

8. The deflection member according to claim 1, characterized in that the first connecting portion and the second connecting portion are respectively configured to be composed of two or more segments extending in different directions.

9. A breaking module, comprising:

a housing;

a first static contact and a second static contact;

a first moving contact and a second moving contact;

a moving contact bracket connected to the first moving contact and the second moving contact and configured to move in a first direction to actuate the first moving contact and the second moving contact to move in the first direction, thereby realizing an engagement and separation of the first moving contact and the first static contact as well as an engagement and separation of the second moving contact and the second static contact;

a first arc extinguishing chamber and a second arc extinguishing chamber arranged on either side of the moving contact bracket in a second direction perpendicular to the first direction;

a first arc-guiding piece extending from a first arc-guiding starting end adjacent to the first static contact to a first arc-guiding ending end adjacent to the first arc extinguishing chamber;

a second arc-guiding piece extending from a second arc-guiding starting end adjacent to the second static contact to a second arc-guiding ending end adjacent to the second arc extinguishing chamber; and a deflection member comprising:

a first arc striking portion and a second arc striking portion extending in a first direction and parallel to each other;

a base portion extending in a second direction perpendicular to the first direction and disposed in a biased manner between the first arc striking portion and the second arc striking portion in the second direction;

a first connecting portion connecting the base portion and the first arc striking portion; and a second connecting portion connecting the base portion and the second arc striking portion, wherein the first arc striking portion is arranged between the first moving contact and the first arc extinguishing chamber to guide an arc from the first moving contact to the first arc extinguishing chamber, and the second arc striking portion is arranged between the second moving contact and the second arc extinguishing chamber to guide an arc from the second moving contact to the second arc extinguishing chamber, wherein the first connecting portion is provided with a first through hole near the first arc striking portion, the first through hole configured to receive the first moving contact, wherein the second connecting portion is provided with a second through hole near the second arc striking portion, the second through hole configured to receive the second moving contact, wherein the first arc striking portion has a first protruding part positioned in the first through hole, the first protruding part extending in the first direction, and wherein the second arc striking portion has a second protruding part positioned in the second through hole, the second protruding part extending in the first direction, wherein the deflection member is installed to the housing such that the first arc-guiding ending end and the first arc striking portion are arranged on either side of the first arc extinguishing chamber, and the second arc-guiding ending end and the second arc striking portion are arranged on either side of the second arc extinguishing chamber.

10. A contactor characterized in comprising the breaking module according to claim 9.

11. The breaking module of claim 9, wherein the first connecting portion is connected to the first arc striking portion at a first proximal end of the first arc striking portion near the base portion.

12. The breaking module of claim 11, wherein the second connecting portion is connected to the second arc striking portion at a second proximal end of the second arc striking portion near the base portion.

13. The breaking module of claim 9, wherein the first protruding part is positioned at a first distal end of the first arc striking portion, the first distal end positioned away from the base portion.

14. The breaking module of claim 13, wherein the second protruding part is positioned at a second distal end of the second arc striking portion, the second distal end positioned away from the base portion.

15. A deflection member, characterized in that the deflection member is installed in a breaking module of a contactor, and the breaking module comprises: a first moving contact and a first static contact which are configured to be respectively engaged with and separated from each other, as well as a second moving contact and a second static contact which are configured to be respectively engaged with and separated from each other; a first arc extinguishing chamber arranged adjacent to the first moving contact and a second arc extinguishing chamber arranged adjacent to the second moving contact, wherein the deflection member comprises:

a first arc striking portion and a second arc striking portion extending in a first direction and parallel to each other;

a base portion extending in a second direction perpendicular to the first direction and disposed in a biased manner between the first arc striking portion and the second arc striking portion in the second direction;

a first connecting portion connecting the base portion and the first arc striking portion; and a second connecting portion connecting the base portion and the second arc striking portion, wherein the first connecting portion and the second connecting portion comprise two or more segments extending in different directions;

wherein the first arc striking portion is arranged between the first moving contact and the first arc extinguishing chamber to guide an arc from the first moving contact to the first arc extinguishing chamber, and the second arc striking portion is arranged between the second moving contact and the second arc extinguishing chamber to guide an arc from the second moving contact to the second arc extinguishing chamber.

16. The deflection member of claim 15, wherein the first connecting portion is provided with a first through hole near the first arc striking portion, the first through hole configured to receive the first moving contact, and wherein the second connecting portion is provided with a second through hole near the second arc striking portion, the second through hole configured to receive the second moving contact.

17. The deflection member of claim 16, wherein the first arc striking portion has a first protruding part positioned in the first through hole, the first protruding part extending in the first direction, and wherein the second arc striking portion has a second protruding part positioned in the second through hole, the second protruding part extending in the first direction.

18. The deflection member of claim 15, wherein the first connecting portion is connected to the first arc striking portion at a first proximal end of the first arc striking portion near the base portion, and wherein the second connecting portion is connected to the second arc striking portion at a second proximal end of the second arc striking portion near the base portion.

19. The deflection member of claim 17, wherein the first protruding part is positioned at a first distal end of the first arc striking portion, the first distal end positioned away from the base portion, wherein the second protruding part is positioned at a second distal end of the second arc striking portion, the second distal end positioned away from the base portion.

20. The deflection member of claim 16, wherein the first through hole and the second through hole are formed in the two or more segments of the first connecting portion and the second connecting portion.

* * * * *